United States Patent [19]

Rahlwes

[11] Patent Number: 5,302,352
[45] Date of Patent: Apr. 12, 1994

[54] PROTECTED COILS FOR A STEAM GENERATOR

[75] Inventor: William C. Rahlwes, Lake Jackson, Tex.

[73] Assignee: Phillips Petroleum Company, Bartlesville, Okla.

[21] Appl. No.: 985,056

[22] Filed: Dec. 3, 1992

Related U.S. Application Data

[62] Division of Ser. No. 592,726, Oct. 4, 1990.

[51] Int. Cl.$^5$ .................... F27B 15/16; B01J 8/26
[52] U.S. Cl. .................... 422/146; 34/57 A; 110/245; 122/4 D; 165/104.16; 165/134.1; 208/113; 208/120; 422/201
[58] Field of Search .......... 422/146, 200, 201; 110/245; 122/4 D; 165/104.16, 134.1; 208/113, 120; 34/57 A

[56] References Cited

U.S. PATENT DOCUMENTS

| | | | |
|---|---|---|---|
| 2,819,951 | 1/1958 | Medlin et al. | 422/146 X |
| 2,847,366 | 8/1958 | Boisture et al. | 422/146 X |
| 3,983,927 | 10/1976 | Stewer et al. | 165/104.16 X |
| 4,407,355 | 10/1983 | Bonn et al. | 165/104 |
| 4,563,267 | 1/1986 | Graham et al. | 208/159 |
| 4,811,696 | 3/1989 | Lacquement et al. | 122/4 D |
| 4,843,050 | 6/1989 | Rahlwes et al. | 502/41 |

Primary Examiner—Robert J. Warden
Assistant Examiner—Amalia Santiago
Attorney, Agent, or Firm—George E. Bogatie

[57] ABSTRACT

In a steam generator for recovering heat in a hot fluidized bed of solid particles, wherein generally horizontally oriented coils of the steam generator make a 180° U-bend, the U-bend portion of the coils are protected from overheating by installing an open top insulating box around the U-bend portion of the coil. In use solid particles from the circulating fluidized bed accumulate in the insulating box thus providing a non-moving layer of solid particles surrounding the U-bend which thermally insulates the U-bend portion of the coil from the higher temperature encountered in the moving fluidized bed.

10 Claims, 3 Drawing Sheets

PROTECTED COILS FOR A STEAM GENERATOR

This is a division of application Ser. No. 07/592,726 filed Oct. 4, 1990.

This invention relates to steam generators for heat recovery in hot fluidized beds of solid particles. In one aspect, it relates to a steam generator for use in cooling a hot fluidized bed. In another aspect, it relates to apparatus for protecting steam generating coils which are exposed to harsh thermal and corrosive conditions in the catalyst bed.

Various forms of fluidized bed chemical processing units incorporate coils for cooling or heating purposes. One particular fluidized bed processing unit which usually employs coils immersed in a fluidized bed (i.e., bed coils) to generate saturated steam, is the regenerator section of a fluid catalytic cracking unit (FCCU) for cracking of petroleum hydrocarbons. In this catalyst regenerator section coke deposits, which were deposited on the catalyst during the cracking reaction, are burned off the catalyst in the presence of an oxygen containing gas such that a great deal of waste heat is created in the catalyst bed. The hot regenerator catalyst bed is typically cooled by a steam generator which recovers heat from the bed. The steam generator generally comprises a bed coil bundle which as previously stated is immersed in the dense part of the catalyst bed. Tube sheets, baffles, tie rods and spacers usually complete the bundle which is immersed in the dense catalyst bed. The coils, however, are the most important part of the steam generator. Further, the coils generally constitute the most expensive component of the steam generator and are the component most likely to crack and/or corrode. The bed coil bundle is customarily protected by baffles against impingement of abrasive incoming catalyst, and catalyst which is circulated in a fluidized bed. The bed coils, however, are subjected to thermal shock in various operations such as load changes, startup, changes in feed composition, etc. As a result, the bed coils are subjected to thermally induced stress with the magnitude of the developed stress being proportional to the magnitude of the temperature change. A particularly vulnerable portion of the bed coil occurs where a horizontally disposed coil makes a 180° bend or so called U-bend. This is because a steam blanket can form in the inside wall of the coil in the bend area which prevents usual cooling of the tube wall, causing the bend area to rapidly heat up to regenerator temperatures. This greater temperature change at the U-bend area induces added stress compared to the remainder of the coil, and causes early cracks and erosion of the coil in the U-bend area. Frequently the temperature changes in the bed coils is as great as 400°-800° F. and in such cases the useful life of the coil is greatly curtailed as a result of thermal stress.

Accordingly, it is an object of this invention to reduce the failures of steam generator coils in an FCCU regenerator bed.

It is a further object of this invention to reliably maintain steam production from a steam generator disposed in a fluidized catalyst bed.

It is another object of this invention to extend the useful life of the steam generator coils which are disposed in the fluidized catalyst beds.

It is still another object of this invention to thermally insulate the U-bend portion of a steam generator coil so as to protect the U-bend from overheating and to reduce the occurrence of thermally induced shock in the U-bend portion of the coil.

BRIEF DESCRIPTION OF THE DRAWINGS

These and other objects and advantages of this invention will become apparent to those skilled in the art from the following detailed description of the preferred embodiment, the appended claims and the drawings in which:

SUMMARY OF THE INVENTION

In accordance with this invention, I have discovered an improved apparatus for protecting horizontally oriented coils having a U-bend when the coils are used in a steam generator which recovers heat from a bed of hot fluidized solid particles. The protection is achieved by installing an insulating box, having an open top structure, around the U-bend portion of a steam generator bed coil. In operation of the steam generator, solid particles from the circulating fluidized bed are allowed to accumulate in the insulating box, thus providing a quantity of stagnant solids positioned around the U-bend. The quantity of stagnant solids contained in the insulating box, is sufficient to form a layer of non-moving solids surrounding the U-bend which will thermally insulate the U-bend portion of the coil from the higher temperatures encountered in the moving fluidized bed.

In a preferred embodiment the U-bend portion of the bed coil is centered in the insulating box with the use of spacers which are welded only onto the coil and not onto the insulating box. The box is held in place by U-bolts which attach the bottom of the box to the coil. This manner of installation allows for expansion differences in the insulating box and the coil.

DETAILED DESCRIPTION OF THE PREFERRED EMBODIMENT

This invention is described in terms of a steam generator for recovering heat from a fluidized bed that functions as a catalytic cracking unit regenerator. This invention, however, may be practiced in connection with a variety of petroleum or chemical process units that are characterized by the need for cooling a hot catalyst bed, and in particular to cooling fluidized bed processing units that undergo cyclic temperature changes or other cyclic changes in operating conditions. Accordingly, this invention has a number of other applications many of which will be obvious to a person skilled in the art.

Figure 1:
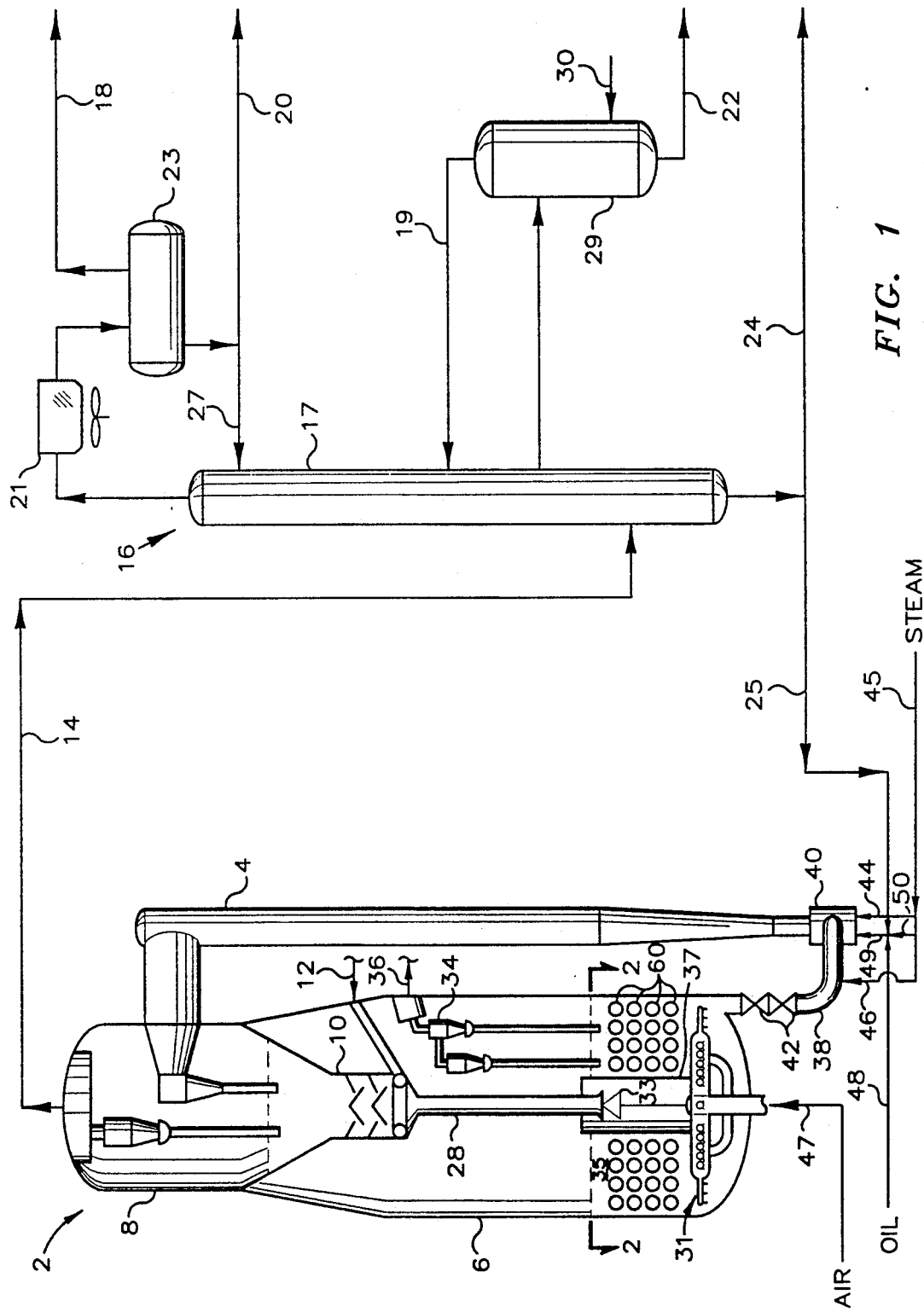
FIG. 1 is a schematic diagram of a fluidic catalytic cracking unit of the type employing a riser-reactor having a catalyst regenerator which embodies the present invention.

Referring now to FIG. 1, one type of fluid catalytic cracking unit generally indicated at 2 comprises a reactor 4, a regenerator 6, a catalyst/product separation zone or disengager 8, which usually contains several cyclone separators, and a stripping section or zone 10 in which gas, usually steam introduced from conduit 12, strips entrained hydrocarbons from the coked catalyst. Cracked hydrocarbon product from the separation zone 8 is conveyed via line 14 to a separation zone 16 including a main fractionator 17. The fractionator product can be separated for example as follows: Light gaseous hydrocarbons in condenser 21 can be withdrawn from the zone 16 via conduit 18. Gasoline range liquids accumulated in accumulator 23 can be withdrawn via conduit 20 or refluxed via conduit 27. Distillates such as light cycle oils can be withdrawn via conduit 22 from stripper 29 after being stripped with steam introduced via line 30. The overhead of light hydrocarbons withdrawn in conduit 19 from stripper 29 can be recycled to column 17. Bottoms from column 17 can be withdrawn by conduit 24 or recycled to the riser reactor 4 by conduit 25 as desired.

After being stripped in zone 10, the used cracking catalyst is conveyed from zone 10 to the regenerator 6 by conduit or stand pipe 28 for the purpose of coke burn off. Flow of catalyst into the regenerator 6 can be controlled by plug valve 33 positioned under the outlet of standpipe 28. The catalyst can be distributed from standpipe 28 into a dense phase fluidized bed 35 by flowing over a weir 37 positioned in regenerator 6. In regenerator 6, molecular oxygen containing gas, usually air or an air/steam mixture, is introduced via conduit 47 and distributed by one or more distributors 31. Coke deposits are burned from the catalyst in regenerator 6 creating a great deal of waste heat and forming an effluent gas which is separated from the catalyst through a plurality of cyclone separators 34. These flu gases are withdrawn from regenerator 6 via conduit 36. The bed coil bundle 60 comprises a plurality of steam generating coils, also referred to as 60, as will be described more fully hereinafter.

Hot regenerated catalyst passes from regenerator 6 to a lift area 40 at the lower end of riser reactor 4 via conduit 38, which provides a source of hot low carbon containing cracking catalyst particles for use in riser reactor 4. The flow rate of regenerated catalyst is controlled by valves 42 which are positioned in conduit 38, preferably in a vertical portion thereof. In lift area 40, regenerated catalyst from conduit 38 is fluidized with a fluidizing gas, usually steam, which is introduced into lift area 40 by either conduit 44 or 46 connected to a steam source supplied via conduit 45. The oil feedstock is introduced into lift area 40 via a nozzle assembly 49, which is connected to a source of oil feedstock, such as gas oil feed supplied via conduit 48, and the recycle conduit 25. Atomizing gas such as steam can be added to the nozzle assembly 49 by conduit 50, for example, which connects nozzle assembly 49 to the steam source via conduit 45.

The operating conditions for riser reactor 4 and regenerator 6 can be conventional. Usually the temperature in riser reactor 4 will be in a range of from about 850° F. to about 1050° F., preferably in the range of from about 925° F. to about 1025° F. for heavy petroleum oils. The oil is usually admixed with steam for the weight ratio of oil to steam in a range of from about 6:1 to about 25:1. A catalyst:oil weight ratio employed in riser reactor 4 is generally in the range of from about 2:1 to about 20:1, usually between about 2:1 and about 15:1, preferably between about 3:1 to about 10:1. Pressure in riser reactor 4 is usually in a range from about 15 psia to about 60 psia, preferably the pressure is less than about 25 psia for heavy petroleum oils. The cracking catalyst particles generally have a size in the range from about 20 microns to about 200 microns, usually from about 40 microns to about 80 microns, preferably about 60 microns. Flow velocity upward in the vertical section of riser reactor 4 is generally in the range from about 10 feet per second to about 30 feet per second in the lower portion of riser reactor 4 up to about 40 feet per second to about 120 feet per second in the upper portion of riser reactor 4. The contact time between the catalyst and oil in riser reactor 4 is generally in a range from about 0.25 seconds to about 4 seconds, usually from about 1 second to about 3 seconds when the oil is injected into the bottom of the riser. Preferably, contact times for heavy oils are less than about 2.5 seconds. The regenerator is generally operated at a temperature from about 1100° F. to about 1500° F., usually from about 1150° F. to about 1450° F., and is ordinarily provided with sufficient oxygen containing gas to reduce the coke on the catalyst to a level of about 0.5 weight-% or less, preferably less than 0.1 weight-%.

Any suitable catalyst may be used for practicing this invention. Examples of such catalysts suitable for catalytic cracking include, but are not limited to, silica-alumina or silica-magnesia, synthetic microspheres or ground gels and various natural clay type or synthetic gel type catalysts. Most preferably, fluidized zeolite containing cracking catalysts are employed. Preferred catalysts can have a surface area in a range from about 50 $m^2/g$ to about 500 $m^2/g$ and have an average particle size in the range from about 40 microns to about 80 microns.

Figure 2:
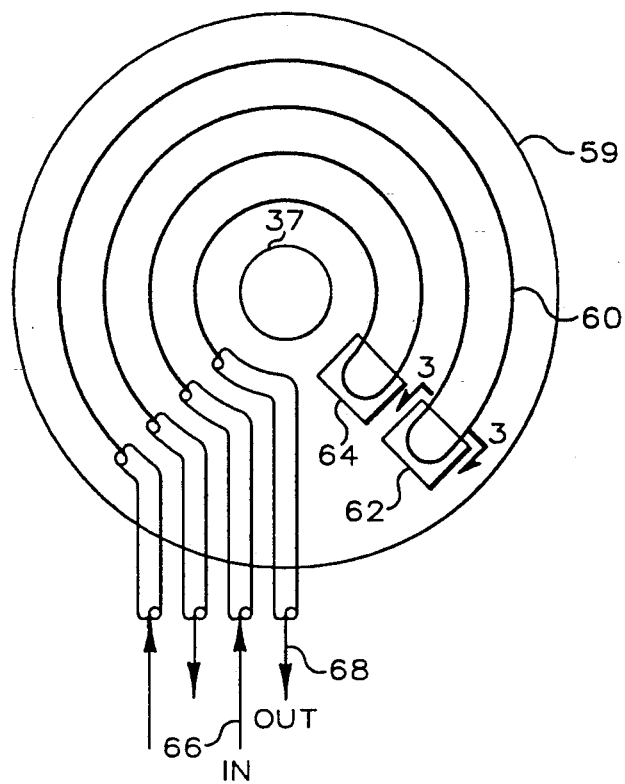
FIG. 2 is a view taken along lines 2—2 illustrated in FIG. 1.

Referring now to FIG. 2, there is illustrated a view of the steam generating coil bundle 60 taken along lines 2—2 in FIG. 1. The coils 60 are immersed in the hot fluidized catalyst bed. Each coil enters the bed through the regenerator wall 59, then circles the outer circumference of the bed, and then forms a U-bend, retraces the circle and exits the regenerator walls near the point of entry. Thus, a coil comprises an inlet section which is parallel to and spaced apart from an outlet section. These coils are expected to be cycled in and out of service a number of times during, or as a consequence of, operation of riser reactor 4 and regenerator 6. For each coil 60, feed water enters an inlet conduit 66 and saturated steam discharges via exit conduit 68 for utilization as desired. Only 2 horizontally disposed bed coils 60 are illustrated in FIG. 2 for the sake of simplicity. The typical commercial catalyst regenerator fluidized bed would contain a bundle of coils having 3 or more coils in a single horizontal plane and further have additional coils in 4 or 5 more other horizontal planes in stacked relationship with the illustrated horizontal plane. The coil 60, as well as any tube sheets, baffles, support plates, tie rods, feed through fittings, spacers, etc. which are required to complete the bundle 60, are conventional and are supplied in accordance with known heat exchange technology.

It is the insulating box 62 attached to the U-bend 64 of the coil 60, that provides the novel feature of this invention. The box 62 provides thermal insulation which prevents the U-bend 64 from being overheated by the hot circulating catalyst of the fluidized bed. This is accomplished by entrapping a quantity of catalyst and stagnating the entrapped catalyst in the box 62 so as to form a non-moving layer of catalyst surrounding the U-bend 64. The functional requirements for insulating box 62 for providing adequate protection for the U-bend 64 are: (1) centering the box 62 both horizontally and vertically so as to contain the U-bend 64 at the center of the box 62; (2) allowing for thermal expansion differences between the box 62 and the coil 60; and (3) forming a sufficient layer of catalyst surrounding the U-bend 64 to protect the U-bend from overheating.

Figure 3:
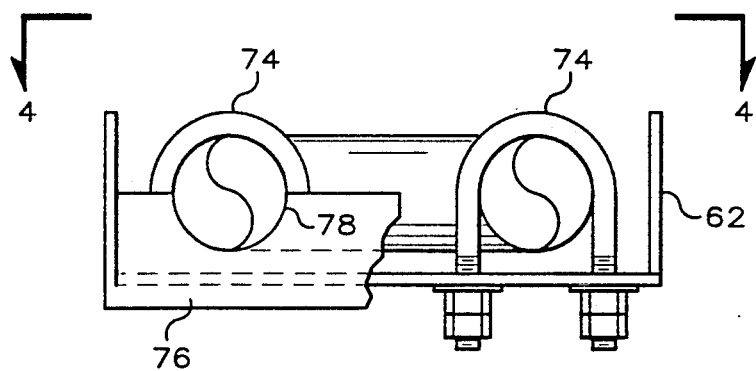
FIG. 3 is a view taken along lines 3—3 of FIG. 2.

The box 62, which can be formed of any suitable material, is preferably constructed of ⅛ inch thick stainless steel plates which includes two side plates, two end plates and a floor. In the preferred embodiment illustrating in FIGS. 3, 4 and 5, the box 62 is carried by the bed coil 60. This is accomplished by 4 appropriately spaced U-bolts 74 which attach straight sections of the coil 60 to the bottom of the box 62. At the end of the box farthest away from the U-bend 64, there is provided an end plate 76 having a pair of semi-circular cavities 78 matching the diameter of the coil 60, for receiving circular sections of the coil 60.

Figure 4:
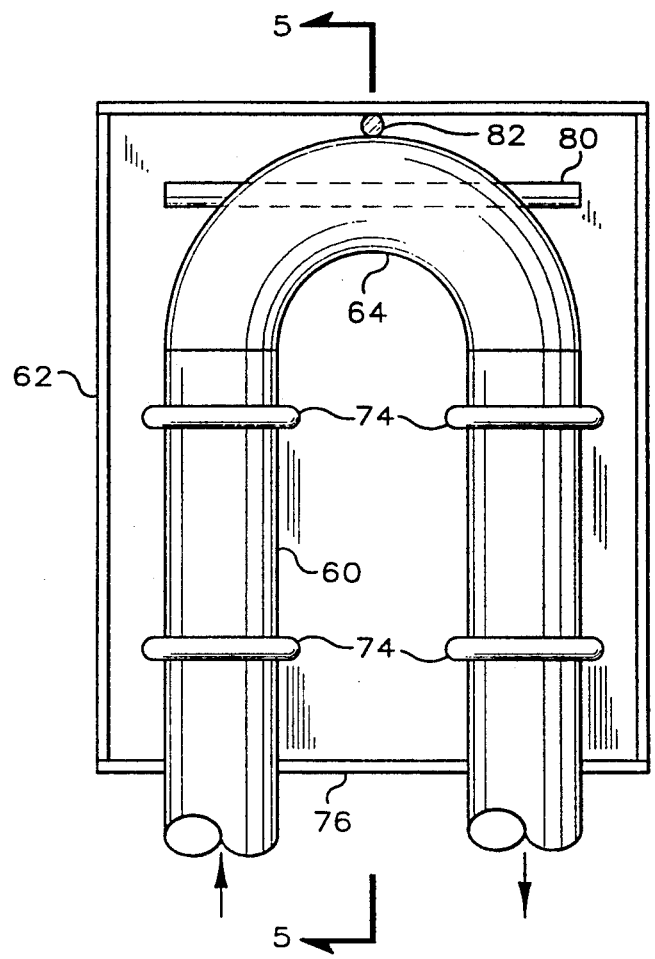
FIG. 4 is a view taken along lines 4—4 of FIG. 3.
Figure 5:
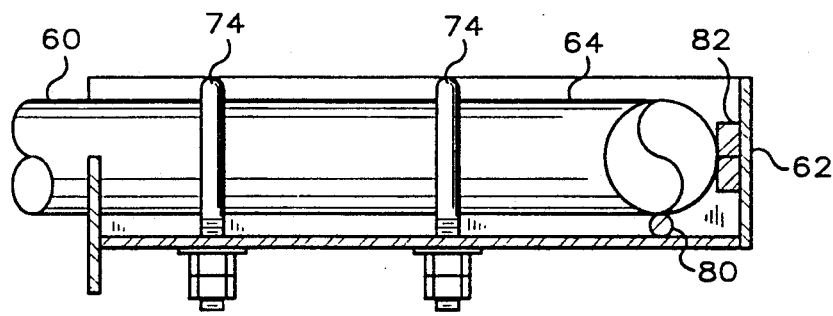
FIG. 5 is a view taken along lines 5—5 of FIG. 4.

Spacers 80 and 82 illustrated in FIG. 4, are tack welded only to the U-bend 64, and are provided for centering the U-bend 64 within the box 62. There can be considerable variation in the size of the insulating box 62, depending primarily on the diameter of the coil, radius of the U-bend, etc. The length, width and depth dimension of the boxes 62 will be sufficient to allow for a quantity of non-moving catalyst to accumulate in the box 62 that is effective for protecting the U-bend from overheating. If the bed contains fluidized cracking catalyst generally about a 1 inch layer of non moving catalyst surrounding the U-bend is sufficient. The box 62 will typically extend a length of about 3 diameters of the coil away from the U-bend 64.

While the invention has been described in terms of the presently preferred embodiment, reasonable variations and modifications are possible by those skilled in the art, within the scope of the described invention and the appended claims thereto.

That which is claimed is:

1. Apparatus comprising:
 a first vessel for containing a bed of solid particles;
 at least one horizontally oriented steam generating coil having an inlet section, an outlet section and a U-bend between said inlet and outlet sections, wherein said at least one coil is inside said first vessel for contacting said bed of solid particles;
 means for fluidizing said bed of solid particles so as to form a fluidized bed of solid particles surrounding said horizontally oriented steam generating coil; and
 means for forming a non-moving layer of said solid particles surrounding said U-bend while maintaining fluidization of said solid particles surrounding said inlet and outlet sections of said coil.

2. Apparatus in accordance with claim 1, wherein said means for forming said layer of non-moving solid particles comprises:
 a box being defined by two side plates, a first and second end plate, a floor and having an open top, said box being of a size to hold a quantity of catalyst for preventing said U-bend portion of said coil from overheating; and
 means for attaching said box to said at least one coil so as to centrally contain said U-bend portion of said coil in said box.

3. Apparatus in accordance with claim 2, wherein said means attaching said box comprises:
 a first spacer fixedly attached to the underside of said U-bend for separating said U-bend a desired distance above the floor to said insulating box;
 a second spacer fixedly attached to the tip of said U-bend for separating said U-bend a desired distance from said first end plate; and
 a plurality of U-bolts for attaching said box to said coil.

4. Apparatus in accordance with claim 3, wherein said second end plate for said box comprises a pair of semicircular cavities matching the diameter and separation spacing between inlet and return portions of said coil, for receiving circular sections of said coil.

5. Apparatus in accordance with claim 3, wherein said box extends about three diameters of the coil away from said U-bend and said separation distance of said U-bend above the floor of said box is about one inch.

6. Apparatus in accordance with claim 1, wherein said first vessel comprises a catalytic cracking unit regenerator operated at a temperature in a range of from about 1100° F. to about 1500° F., said first vessel containing a fluidized bed of cracking catalyst particles.

7. Apparatus in accordance with claim 6, wherein said means for forming said layer of non-moving particles comprises:
 a box having two side plates, a first and second end plate, a floor and having an open top, said box being of a size to hold a quantity of catalyst for preventing said U-bend portion of said coil from overheating; and
 means for attaching said box to said at least one coil so as to centrally contain said U-bend within said box, wherein catalyst particles from said hot fluidized bed accumulate in said box to form said layer of non-moving particles.

8. Apparatus in accordance with claim 7, wherein said at least one steam generating coil comprises a coil bundle for removing heat, said coil bundle having at least one coil with said box attached in a first horizontal plane, and having additional coils each having a respective said box attached in a second horizontal plane in stacked relationship with said at least one coil in said first horizontal plane.

9. Apparatus in accordance with claim 8, wherein said box horizontally extends along said at least one coil for a distance of about three diameters of said coil away from said U-bend and has a volume sufficient to contain about a one inch layer of non-moving catalyst particles surrounding said U-bend.

10. Apparatus in accordance with claim 8 additionally comprising:
 a second vessel in fluid communication with said first vessel, said second vessel comprising a reactor for catalytic cracking of petroleum hydrocarbons;
 means for withdrawing a mixture of cracked hydrocarbon product and a used catalyst from said second vessel and conveying said mixture to said first vessel; and
 means for separating said cracked hydrocarbon product and said used catalyst in said first vessel.

* * * * *